United States Patent [19]
White

[11] Patent Number: 5,356,342
[45] Date of Patent: Oct. 18, 1994

[54] TEETH FOR A WOBBLESTICK

[75] Inventor: Harvey C. White, Nashville, Tenn.

[73] Assignee: White Hydraulics, Inc., Hopkinsville, Ky.

[21] Appl. No.: 565,731

[22] Filed: Aug. 13, 1990

Related U.S. Application Data

[63] Continuation-in-part of Ser. No. 453,355, Dec. 18, 1989, abandoned, which is a continuation of Ser. No. 118,017, Nov. 6, 1987, abandoned.

[51] Int. Cl.$^5$ .............................................. F16D 3/18
[52] U.S. Cl. ............................... 464/156; 409/12; 418/61.3
[58] Field of Search ............... 464/156, 158, 159; 51/52 HB, 105 HB, 287, 289 R; 418/61.3; 409/10-12, 16, 18, 19, 25, 26, 29, 38, 50-52, 48

[56] References Cited

U.S. PATENT DOCUMENTS

| | | | |
|---|---|---|---|
| Re. 22,173 | 9/1942 | Staples | 409/12 |
| 2,744,449 | 5/1956 | Belden et al. | 409/12 |
| 2,927,510 | 3/1960 | Wildhaber | 409/11 X |
| 3,046,844 | 7/1962 | Wildhaber | 409/12 |
| 3,272,142 | 9/1966 | Easton | 418/61.3 |
| 3,558,245 | 1/1971 | Bolduc | 418/61.3 |
| 3,606,598 | 9/1971 | Albers | 418/61.3 |
| 3,826,108 | 7/1974 | Bradel, Jr. et al. | 464/156 |
| 3,887,309 | 6/1975 | Easton | 418/61.3 |
| 3,892,503 | 7/1975 | Getman | 418/61.3 |
| 3,973,880 | 8/1976 | Swedberg | 464/156 X |
| 4,132,090 | 1/1979 | McDermott | 464/156 |
| 4,335,963 | 6/1982 | Jameson et al. | 464/156 X |
| 4,411,606 | 10/1983 | Miller | 418/61.3 |
| 4,414,495 | 11/1983 | Sumi et al. | 51/105 HB |
| 4,493,622 | 1/1985 | Miller | 464/156 X |

Primary Examiner—Daniel P. Stodola
Attorney, Agent, or Firm—Lightbody & Lucas

[57] ABSTRACT

A wobblestick for forming teeth on a wobblestick wherein the minimum distance between the axis of the hob and the axis of the wobblestick remain substantially uniform throughout the forming of the teeth so as to form the teeth while producing a wobblestick having a uniform diameter throughout the length of the wobblestick.

12 Claims, 6 Drawing Sheets

TEETH FOR A WOBBLESTICK

This is a continuation-in-part of U.S. application Ser. No. 07/453,355, filed Dec. 18, 1989, now abandoned, which is a continuation of U.S. application Ser. No. 07/118,017 filed Nov. 6, 1987, also now abandoned.

FIELD TO WHICH INVENTION RELATES

This invention relates to a wobblestick for connecting axially displaced rotating members.

BACKGROUND OF THE INVENTION

Wobblesticks have been utilized to drivingly connect rotating members that have their axes displaced from each other by angle and/or lateral offset. The wobblestick extends between the two rotating members with the equivalent of a simple universal joint to both. A typical application for a wobblestick is in a gerotor motor to connect the rotating and orbiting rotor to the rotating input/output shaft. Wobblesticks, while a simple and cost effective way of drivingly connecting offset rotating members, unfortunately also have a limited life (due primarily to their wear characteristics), have a limited torque carrying capacity (due primarily to their method of manufacture), and have other problems that limit their applications.

SUMMARY OF THE INVENTION

It is an object of this invention to increase the service life of wobblesticks.

It is an object of this invention to increase the torque carrying capacity of wobblesticks.

It is an object of this invention to reduce the cost of the manufacture of wobblesticks.

Other objects and a more complete understanding of the invention may be had by referring to the drawings in which:

This invention relates to a wobblestick 10. The wobblestick 10 has a body 20 and two sets of splines 30, one at either end of the body 20.

Figure 11:
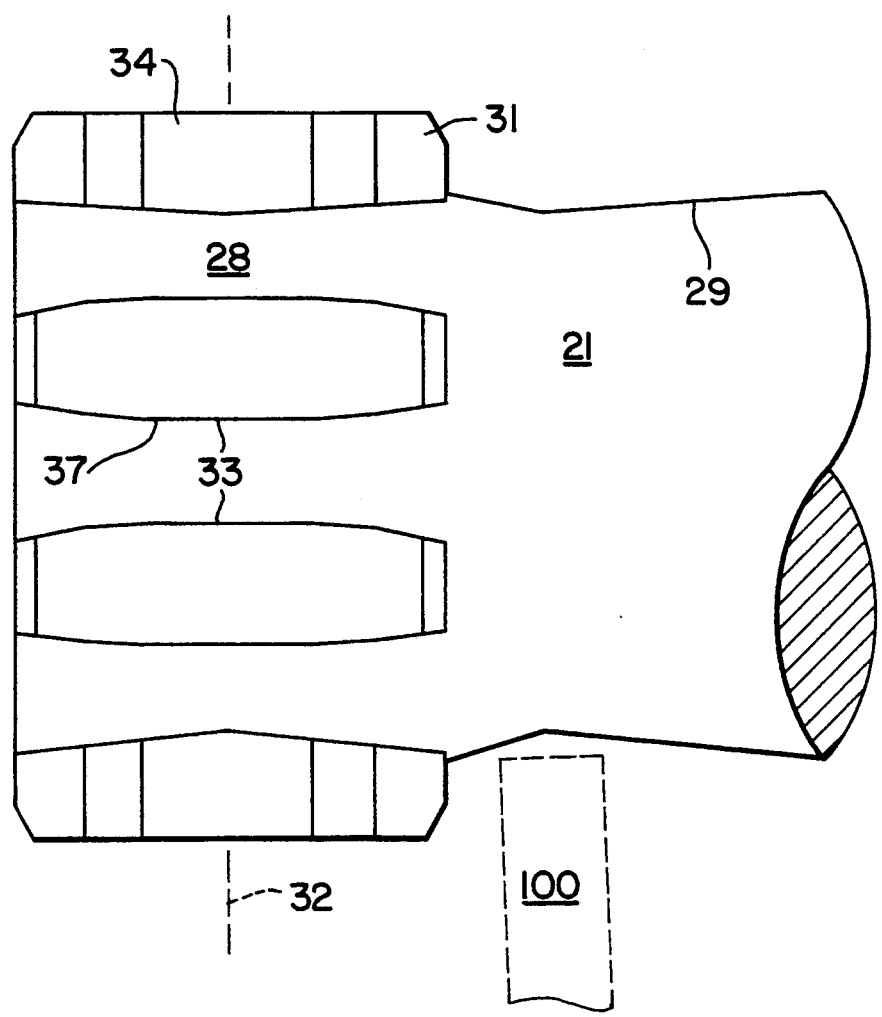
FIG. 11 is an enlarged view of an end of a wobblestick like FIG. 5 with the inclusion of a reduced section.

The body 20 of the wobblestick 10 has an external surface 21 and a longitudinal axis 22. The external surface 21 of the body 20 of the wobblestick 10 is formed in the shape of a cylinder having a substantially uniform radius 23 about the longitudinal axis 22 of the wobblestick 10 throughout the entire length of the wobblestick 10 including the portions 28 of the body 20 of the wobblestick 10 between the intersections of the teeth 31 of the splines 30 and the body 20 of the wobblestick 10. In the particular embodiment shown in the drawings the body 20 is a cylinder some 4.824 inches in length (3.554 inches between splines 30) and 1.046 inches in diameter (measured as the minor diameter of the cylinder bounding the root of the external splines). In use the longitudinal axis 22 of this body 20 of the wobblestick 10 is offset from the longitudinal axis of the allied rotating shafts (not shown) by 0.060 inches in the length of the body 20 of the wobblestick 10. Note that while it is preferred that the body 20 of the wobblestick 10 be of a uniform diameter throughout its length, in certain applications other considerations may dictate otherwise. For example in certain particular devices it may be necessary to neck down the body 20 of the wobblestick 10 to allow clearance for an otherwise interfering plate or rotor through which the wobblestick 10 may extend. The diameter of the body 20 of the wobblestick 10 could therefor have a reduced section 29 (say from 1.046 to 0.920 inches) to provide for clearance as shown in FIG. 11. The reduced section 29 could have sloping sides (as shown and preferred for the spreading of forces) or an abrupt neckdown. The diameter could also be increased for strength or other considerations.

Figure 1:
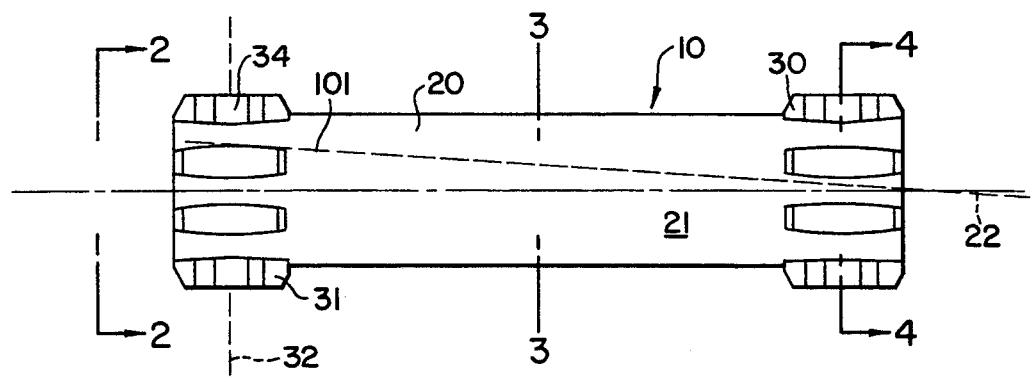
FIG. 1 is a side view of a wobblestick incorporating the invention.
Figure 13:
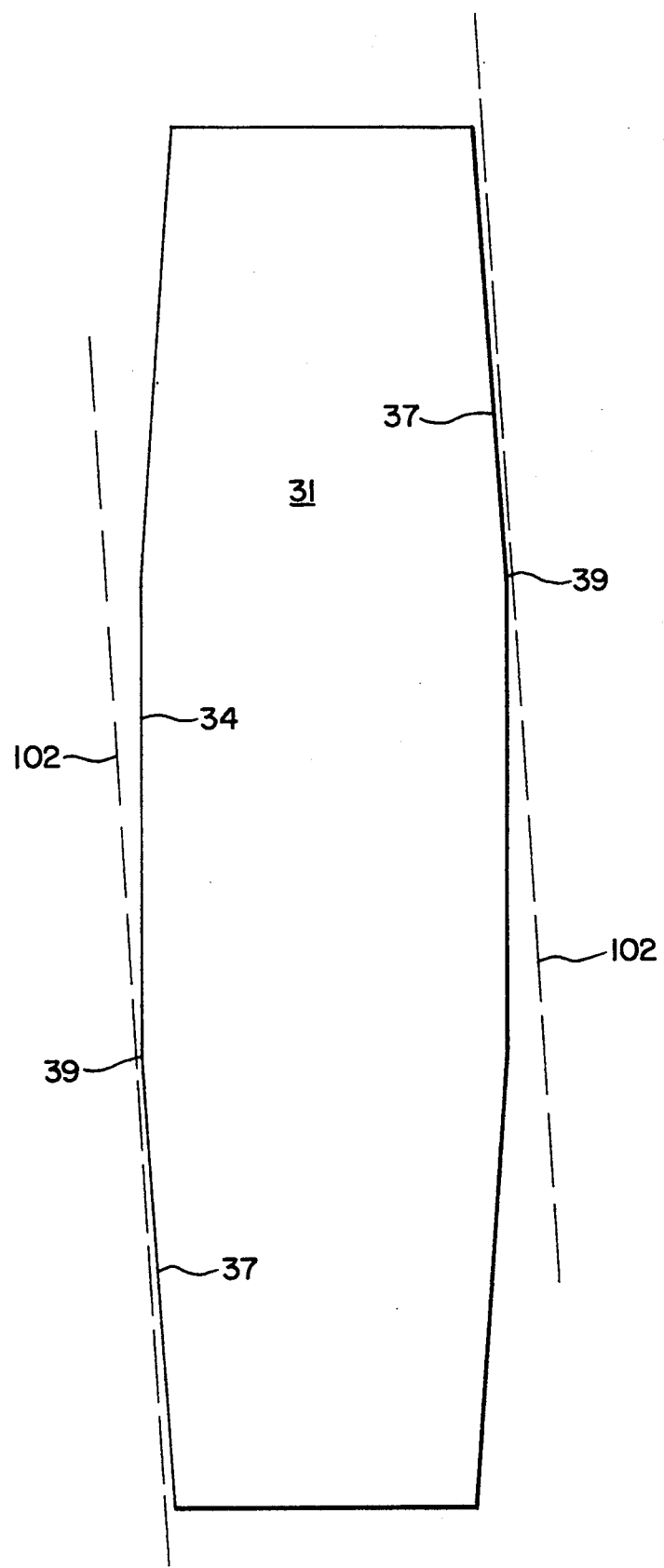
FIG. 13 is an enlarged view of the top of a wobblestick tooth incorporating the invention showing tooth contact planes; and, FIG. 14 is an enlarged view of a wobblestick tooth incorporating a modification omitting the flat contact section.
Figure 14:
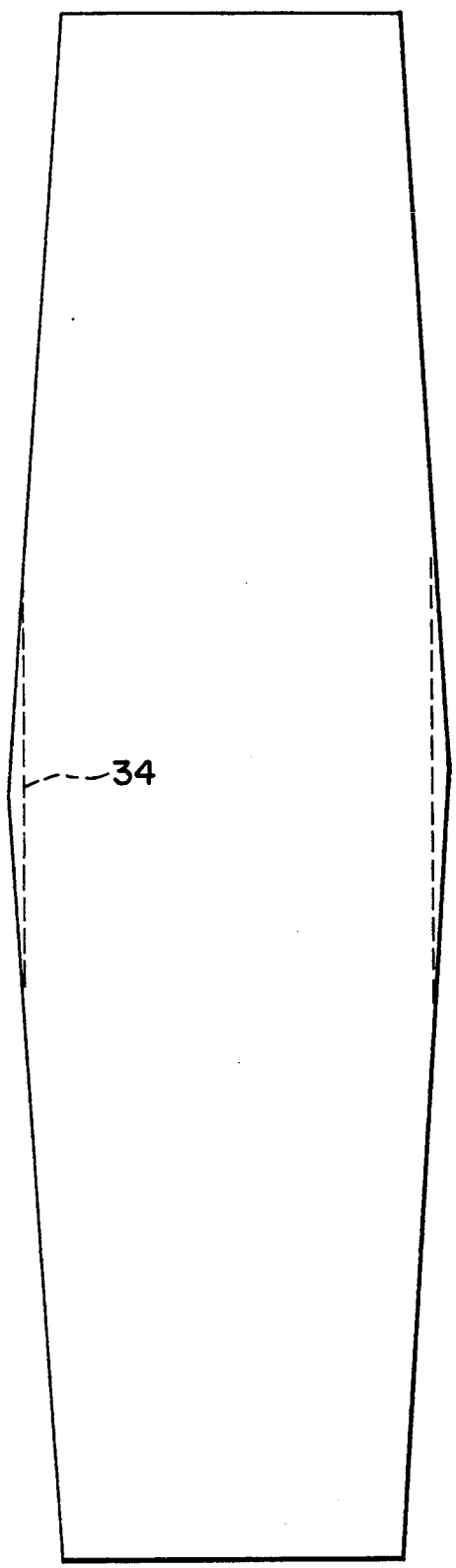

The splines 30 of the wobblestick 10 are formed on the external surface 21 at the ends of the body 20 of the wobblestick 10. In the particular embodiment shown in the drawings there are 12 teeth 31 having a 10/20 pitch. The center line 32 of the teeth 31 is spaced 0.405 inches from the ends of the body 20 of the wobblestick 10. The teeth 31 themselves are 0.635 inches in length measured at full spline There is 0.189 inches between the root or intersections 33 of neighboring teeth 31 on the external surface 21 of the body 20 of the wobblestick 10. The major diameter of the spline 30, measured at the crest 34 of the teeth 31, is 1.294 inches. The pitch diameter of the spline 30, measured through the thickest point 35 of the teeth (0.125 inches) along which the pitch is measured, is 1.200 inches. The minor diameter of the spline 30 is 1.046 with the base diameter measured at the circle such that each tooth profile curve is involute of it being slightly smaller at 1.039. The faces of the teeth 31 are some 0.435 inches long having a wide center section 34 with two leading and trailing sections or faces 37 set at a primary angle of some 2 degrees 45 seconds to the center section. As shown in FIGS. 1 and 13, the center section 34 is at a lesser angle (0° shown), recessed or otherwise set back in respect to the two leading and trailing sections or faces such that the contact between the teeth 31 and surrounding gear 102 occurs primarily at the joint 39 between the center section 34 and the leading and trailing sections respectively. This is normally displaced from the center of the tooth 31. The center section 35 shown is approximately 25% the total length of the tooth or about 0.220 inches long. The leading and trailing edge surfaces 38 of the teeth 31 are each some 0.100 inches long set at a relief angle greater than the primary angle (seven degrees shown). In an alternate embodiment the wide center section 34 is eliminated (FIG. 14). This tooth 31 shape can be utilized if heat buildup is of a lesser concern than manufacturing ease.

Figure 2:
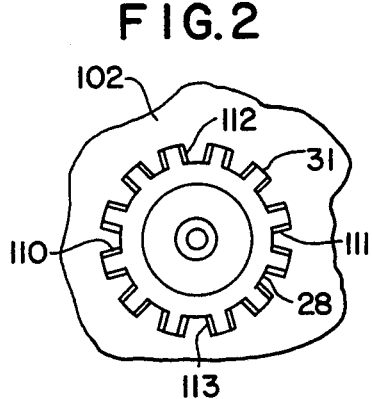
FIG. 2 is an end view of the wobblestick of FIG. 1 taken from lines 2—2 of that figure.
Figure 3:
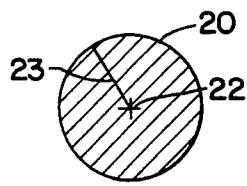
FIG. 3 is a cross-sectional view of the body section of the wobblestick of FIG. 1 taken along lines 3—3 of that figure.
Figure 4:
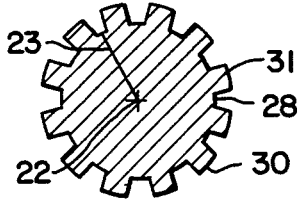
FIG. 4 is a cross-sectional view of the spline section of the wobblestick of FIG. 1 taken along lines 4—4 of that figure.
Figure 5:
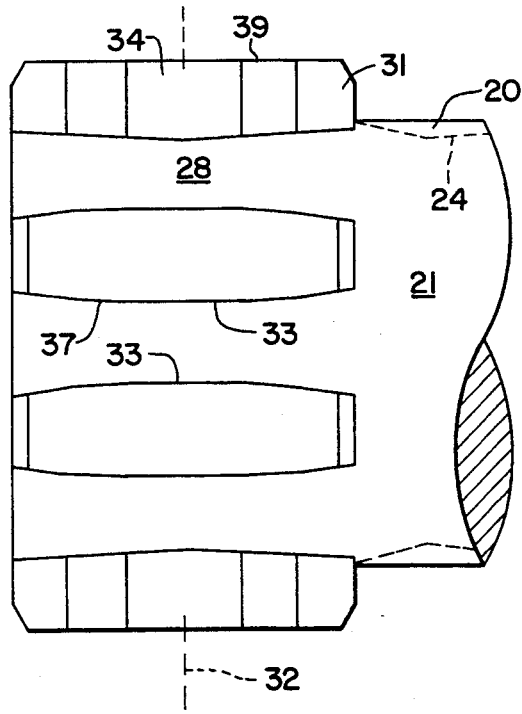
FIG. 5 is an enlarged view of an end of the wobblestick of FIG. 1.
Figure 6:
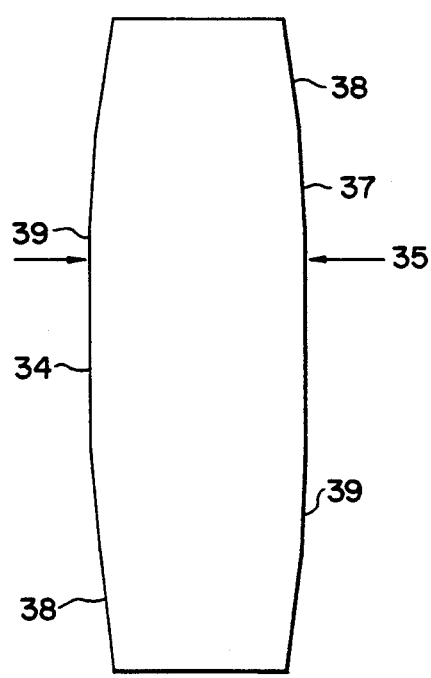
FIG. 6 is an enlarged end on view of a tooth of the spline of the wobblestick of FIGS. 1 and 5.

In use the pressure angle for the teeth 31 shown, the angle that the line of force makes with a line at right angles to the center line of the wobblestick 10 and surrounding gear at the pitch points, is 30 degrees with full contact at nine (110 in FIG. 2) and three (111 in FIG. 2) o'clock with a 2 degree 45 second angle of freedom at noon (112 in FIG. 2) and six (113 in FIG. 2) o'clock. (As shown in FIG. 13, the angle of freedom is the angle that the longitudinal axis 22 of the wobblestick 10 describes in reference to the longitudinal axis 101 of the rotating shafts or associated gear 102 that such wobblestick connects.) The 2 degree 45 second angle of freedom is, however, fully absorbed by load induced deflection such that there is also contact at noon and six upon the application of any significant torque between the wobblestick 10 and surrounding gear (see FIG. 15). This and the fact that the teeth do not cut into the external surface 21 of the body 20 of the wobblestick 10 increases the torque carrying capacity of the wobblestick by 50%. Due to the wide center section 34, the primary contact between the teeth 31 of the wobblestick 10 and the surrounding gear occurs at a location displaced from the center of such teeth 31. In the preferred embodiment as shown in FIG. 13, this primary contact occurs at the outer ends 39 of the 0° center section 34. This has the effect of spreading out the heat load that occurs due to the physical deformation of the teeth under load and the sliding contact between the teeth 31 and surrounding gear. This spreading out of the heat load increases the life and efficiency of this critical mechanical interconnection. Note that this relocation of the primary contact from the center of the teeth 31 also has the effect of allowing cooling of the teeth 31 and surrounding gear in that the primary contact at 3 o'clock is at the other end of the center section 34 than the primary contact at 9 o'clock in the example described. This also adds to the life of the drive. The extent of the center section 34 is not critical. Short center sections are stronger but build up more heat by concentrating the primary contact points between the teeth 31 and surrounding gear to a small axial length of such teeth. Longer center sections dissipate heat best but increase the force of physical contact at the point of primary contact while also eventually reducing the area of teeth available to dissipate such force and heat. It is preferred that the section 34 extend from 0–75% of the total length of the tooth 31 with the range about 25% further preferred. This range allows heat reduction while still insuring adequate tooth strength.

Figure 7:
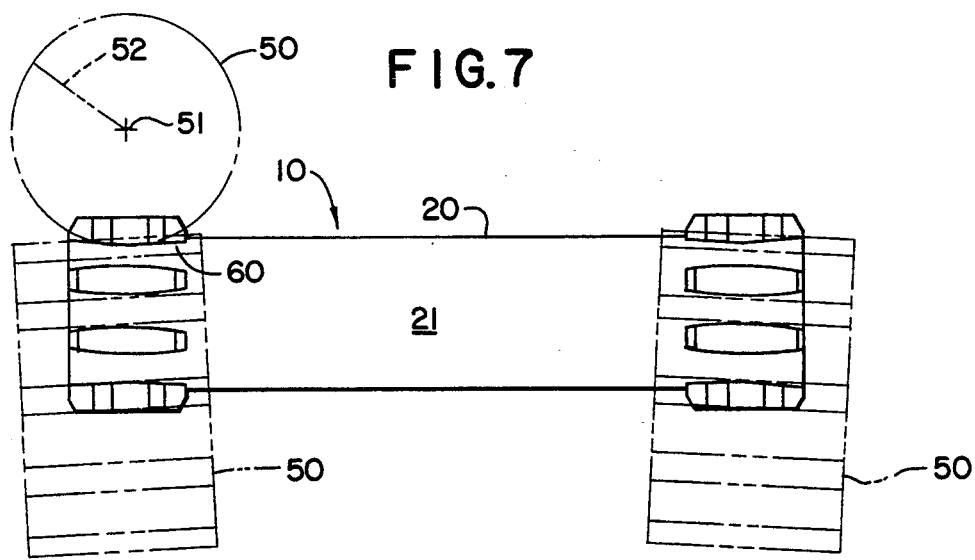
FIG. 7 is a perspective view of a step of manufacture of the wobblestick of FIG. 1.
Figure 8:
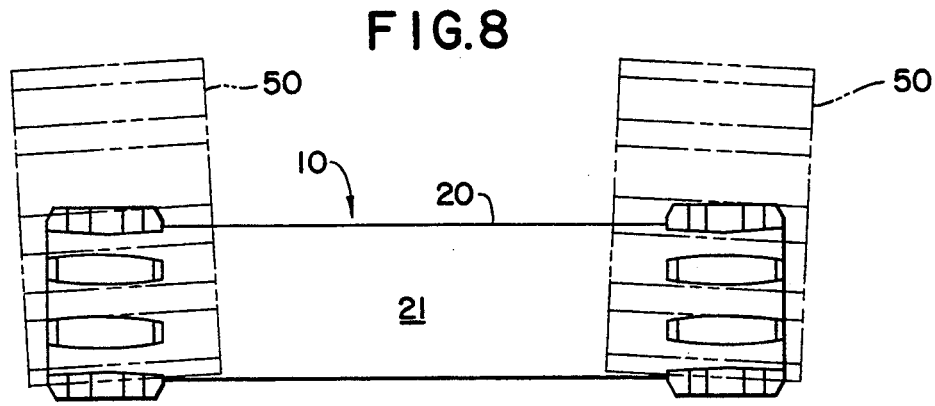
FIG. 8 is a perspective view of another step of manufacture of the wobblestick of FIG. 1.

In addition to a greater torque capacity the wobblestick 10 is also efficient in manufacture (FIGS. 7 and 8). The first step of manufacture is to locate the uncut wobblestick 10 into a rotary chuck—preferably one engaging the wobblestick 10 at the axial ends of the cylinder of the body 20 of the wobblestick 10 (to allow unimpeded access to both splines of the wobblestick 10 with a single chucking). At this time a rotary worm shaped hob 50 is located diagonally off of one side of a spline in preparation for cutting the right helix faces of the spline teeth 31. The rotational axis 51 of the hob 50 is located a distance equal to the radius 52 of the hob 50 away from the external surface 21 of the body of the wobblestick 10 (i.e. the sum of the radii of the hob and body of the wobblestick from the longitudinal axis 22 of the wobblestick) at an angle offset a few degrees to the right from perpendicular to such longitudinal axis of the wobblestick 10. The location of the axis 51 of the hob 50 is designed to insure that the body 20 of the wobblestick 10 remains substantially at a uniform diameter throughout the entire length of the wobblestick 10 (i.e. not cut into). The offset angle of the axis 51 of the hob 50 to the longitudinal axis of the wobblestick 10 is equal to the angle of the helix faces of the spline teeth 31. (The angular offset of the axis 51 of the hob is initially preferably at a higher angle to provide a measure of relief for the outermost tips of the teeth 51 as will be later explained). In the embodiment shown since the radius 52 of the hob 50 is 0.875 inches and the radius of the cylinder of the body 20 of the wobblestick 10 is 0.5023 inches. The axis 51 of the hob 50 is 1.3773 inches away from the longitudinal axis 22 of the wobblestick 10. (This insures a continuous 1.046 inch diameter for the body 20 of the wobblestick 10.) The angular offset of the axis 51 of the hob 50 is seven degrees (somewhat more than the angle of the major portion of the teeth 31), as subsequently to be described. With the wobblestick 10 rotating the hob 51 is slowly moved along the longitudinal axis 22 of the wobblestick 10 for a short distance. In the embodiment shown the rate of movement is 0.060 inches of hob 50 movement per revolution of the wobblestick 10 and the short distance is 0.100 inches. The axis 51 of the hob 50 is then moved to the primary angle of the leading edge of the teeth 31 of the wobblestick 10 (2 degrees 45 seconds right in our example). The hob 51 is then again slowly moved along the longitudinal axis 22 of the wobblestick 10 until a distance displaced from the midpoint of the teeth 31 (generally the thickest portion). At this time the axis 51 of the hob 51 is moved from the primary angle of the leading face of the teeth 31 (2 degrees 45 seconds right in our example) to the angle of the center section (0° in the example). After moving the hob 51 along the longitudinal axis 22 of the wobblestick 10 until a distance displaced from the midpoint of the teeth 31 on the opposite side of such midpoint (0.110 inches in example tooth), the axis of the hob is moved to the primary angle of the trailing face of the teeth 31 (2 degrees 45 seconds left in our example) so as to be oriented correctly for the trailing face of the teeth 31. The hob is then again moved along the longitudinal axis 22 of the wobblestick 110 until a short distance (again 0.100 inches) before the trailing edge of the teeth 31. At this time the axis 51 of the hob is moved to an angle greater than the primary angle (again 7 degrees) to provide a relief for the trailing edge of the teeth 31. The hob 51 is then moved along the longitudinal axis 22 of the wobblestick 10 until clear of the trailing edge of the teeth 31.

The hob 50 in this procedure cuts the right helix of the teeth 31 of the front spline of the wobblestick 10 and in addition shapes the portions 28 of the external surface 21 of the body 20 of the wobblestick 10 between the intersections of the teeth 31 and such body 20.

After cutting the right helix of the teeth 31 of the front spline 30 of the wobblestick 10 the hob 50 performs a similar procedure (preferably in reverse) on the rear spline 30 of the wobblestick. The hob 50 is then flipped substantially end for end (contrast FIG. 8 with FIG. 7). This positions the hob 50 to cut the left helix of the teeth 31 in a similar manner to the right helix.

In this manufacturing procedure the hob 50 is moved parallel to the longitudinal axis 22 of the wobblestick 10 twice along the length of such wobblestick 10, first on the left side and then on the right side. In these two passes the hop 50 shapes all faces of the teeth 31 of both splines 30, and does so with only two angular primary adjustments per spline (2 degrees 45 seconds right to 0° to 2 degrees 45 seconds left) and one adjustment between right and left helix (180 degree reorientation). [The secondary angular adjustments for tooth edge relief (between 7 degrees and 2 degrees, 45 seconds), though preferred, are not absolutely necessary for acceptable tooth shape.] The center distance of the axis 51 of the hob 50 to the axis 22 of the wobblestick is not changed throughout the process. The wobblestick 10 of this invention is thus also efficient in manufacture. Note that if the particular wobblestick 10 has a reduced or differing diameter section 29, this section 29 would preferably be made in a separate operation (although technically the hob 50 could be utilized if there was a sufficient clearance between the section and the teeth i.e. spinning the hob faster and/or wobblestick slower while using the hob as a cutter). The reduced section could also be produced by reducing the minimum distance between the axis of the hob and the axis of the wobblestick at a time other than during the forming of the teeth 31. The hob is shown in FIG. 11 making a reduced diameter section 29 in a separate operation. This reduced diameter can provide clearance for an interfering part 100.

Figure 9:
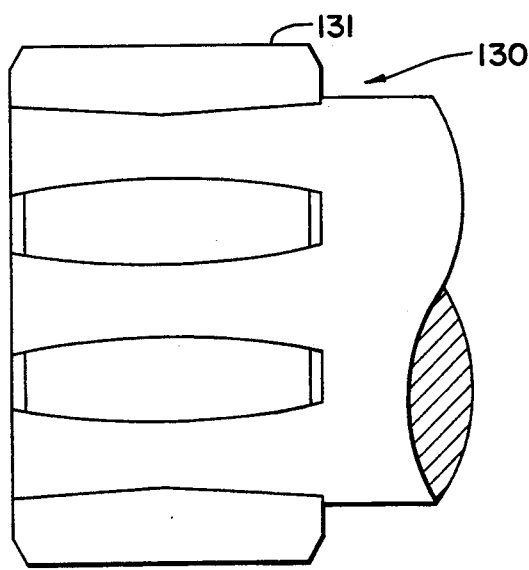
FIG. 9 is an enlarged view of an end of a variation of the wobblestick of FIG. 1.
Figure 10:
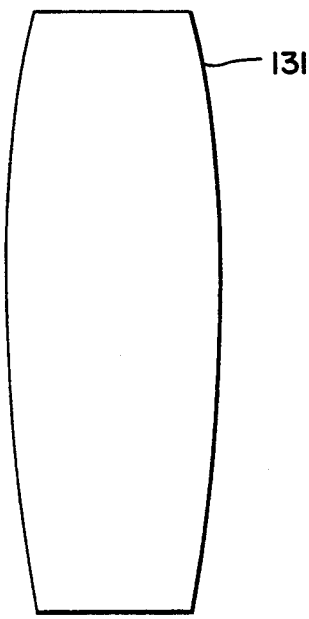
FIG. 10 is an enlarged end on view of a tooth of the spline of the wobblestick of FIG. 9.
Figure 12:
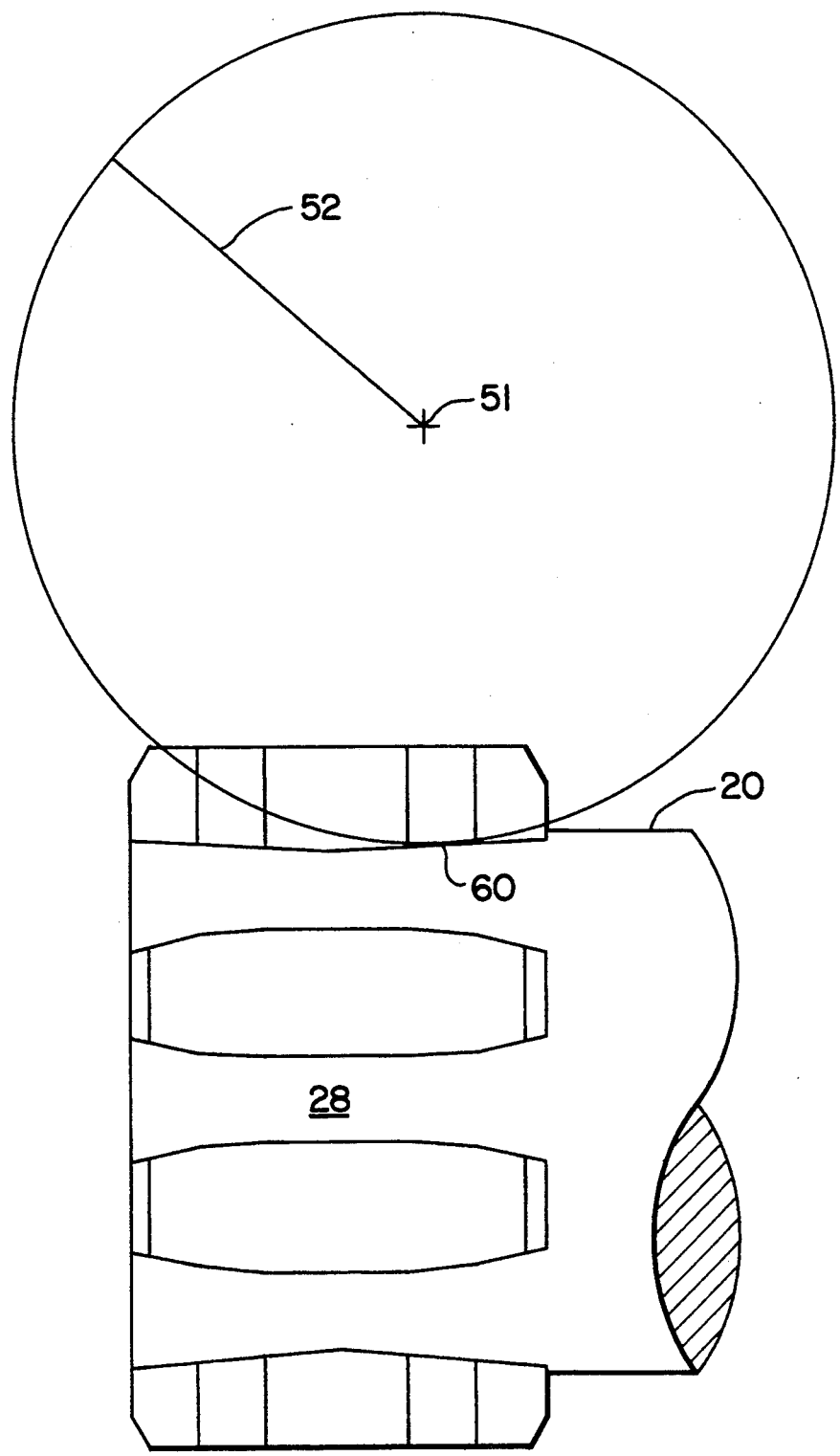
FIG. 12 is an enlarged view of an end of a wobblestick like FIG. 7 with the inclusion of an undercut section.

Although this invention has been described in its preferred form with a certain degree of particularity, it is to be understood that numerous changes may be made without departing from the invention as hereinafter claimed. For example as shown in FIGS. 9 and 10 the teeth of the splines of the wobblestick could be formed in a generated shape (arcuate shown). In these figures the teeth 131 of both splines 130 are formed having faces generally similar to those of the primary FIGS. 1–8 except that they are arcuate generated shape instead of quad planar. This arcuate design makes the shape of the teeth more universal for varied wobblestick and gear combinations and in addition, inherently compensates for wear. To make the preferred arcuate tooth shape the hob is angularly moved through the arc angle while the face of the tooth helix is being formed instead of during a stop (i.e., from 2 degrees 45 seconds right to 0° to 2 degrees 45 seconds left in the length of the teeth 30 while the teeth are being cut instead of the discrete steps 7 degrees right to 2 degrees 45 seconds right to 0° to 2 degrees 45 seconds left to 7 degrees left of the teeth 30 while the teeth are not being cut). If a relief is desired in an arcuate tooth shape the leading and trailing edges are rounded off at a greater angle as in the planar teeth). In addition while it is preferred that the body 20 of the wobblestick 10 remain at the uniform diameter 23 throughout its length, production techniques may qualify this. For example in machining the wobblestick with a Pfauter PE 150 computer numerical control gear cutting machine, locating the axis 51 of the hob 50 a short distance (a ten thousandth or so) inward of its preferred positioning in respect to the longitudinal axis 22 of the wobblestick 10 during the cutting of the 7 degree leading and trailing edge relief speeds the manufacturing process by seconds per tooth face at a cost of a very slight undercut (at 60 in FIG. 12) into the body 20 of the wobblestick 10 neighboring such edges (by moving the hob 50 inward the angles of the axis 51 of the hob 50 do not have to be adjusted the full 7 degrees relief angle during the transitions in respect to the axis 22 of the wobblestick 10). The effect of this undercut is sufficiently limited as to be an acceptable price for the increase in manufacturing speed. An additional example in the preferred embodiment there is a physical resetting of the hob 51 to and from 0° to create the center section 34. The center section 34 could be similarly created by dipping the hob 51 inwards a few thousandths (5 for example) while maintaining a 2 degrees 45 second angle between the axis of the hob 51 and the axis of the wobblestick 10. The hob 51 would then be shifted between 2 degrees 45 seconds on one side to 2 degrees 45 seconds on the other with the dip removed when the trailing edge 37 was again being formed. This dip during the center section 34 would eliminate the 2 degrees 45 second to 0° to 2 degrees 45 second hob axis shift. (The center section 34 could also cut in a totally different pass through of a hob—i.e. knocking off the midpoint otherwise present between leading and trailing faces.) Other changes are also possible without deviating from the invention as claimed:

What is claimed is:

1. An improvement for a wobblestick having a body with a diameter and teeth with a minor diameter, the improvement of the minor diameter of the teeth being equal to the diameter of the body.

2. An improvement for a wobblestick having a body with a diameter and length and teeth extending off of the external surface thereof, the improvement of the diameter of the body of the wobblestick being of uniform diameter throughout its length including at the location of the teeth.

3. The improved wobblestick of claim 2 wherein the wobblestick is utilized in a device having a part that would otherwise interfere with a section of the body of the wobblestick and characterized in that said diameter of the section of the body of said wobblestick being reduced so as to provide clearance for the interfering part.

4. The improved wobblestick of claim 2 characterized in that the teeth have leading and trailing faces and said leading and trailing faces being flat.

5. The improved wobblestick of claim 4 wherein the wobblestick is utilized with an associated gear with the wobblestick having a longitudinal axis extending at a certain angle to the associated gear and characterized in that the planes defined by said leading and trailing faces intersect the longitudinal axis of the wobblestick at an angle substantially equal to the certain angle the longitudinal axis forms with the associated gear.

6. The improved wobblestick of claim 5 wherein the teeth have leading and trailing edge surfaces and characterized in that the leading and trailing edge surfaces are relieved at an angle greater than said angle of said leading and trailing faces.

7. The improved wobblestick of claim 5 characterized by the addition of a center section, said center section being between said leading and trailing faces, and said center section being recessed in respect to said leading and trailing faces.

8. The improved wobblestick of claim 4 wherein the wobblestick is utilized with an associated gear and the teeth normally contact such associated gear at nine and three o'clock and characterized by means for either the wobblestick teeth or the gear to deflect sufficiently so as to allow an additional contact at twelve and six o'clock.

9. The improved wobblestick of claim 2 wherein the teeth have leading and trailing faces and characterized by the addition of a center section, and said center section being between the leading and trailing faces.

10. The improved wobblestick of claim 9 wherein the teeth have a length and characterized in that said center section has a length and said length of said center section being from 0–75% the length of the tooth.

11. The improved wobblestick of claim 10 characterized in that said length of said center section is from 10–30% the length of the tooth.

12. An improvement for a wobblestick having a body with a diameter and length and teeth extending off of the external surface thereof, the wobblestick being utilized with an associated gear with the wobblestick having a longitudinal axis extending at a certain angle to the associated gear, the improvement of the teeth having leading and trailing faces, said leading and trailing faces being flat, the planes defined by said leading and trailing faces intersecting the longitudinal axis of the wobblestick at an angle substantially equal to the certain angle the longitudinal axis forms with the associated gear, the teeth having leading and trailing edge surfaces, said leading and trailing edge surfaces relieved at an angle greater than said angle of said leading and trailing faces, and the diameter of the body of the wobblestick being of a uniform diameter throughout its length including at the location of the teeth except that the minor diameter of the teeth is less than the diameter of the body of the wobblestick at the location of said leading and trailing edge surfaces.

* * * * *